(12) United States Patent
Yasuoka

(10) Patent No.: US 6,393,349 B1
(45) Date of Patent: May 21, 2002

(54) VEHICLE DRIVE FORCE CONTROL DEVICE

(75) Inventor: Masayuki Yasuoka, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/657,437

(22) Filed: Sep. 7, 2000

(30) Foreign Application Priority Data

Sep. 9, 1999 (JP) .......................................... 11-255177

(51) Int. Cl.[7] .......................... B60K 41/14; F16H 61/38; F16H 15/38
(52) U.S. Cl. ........................................... 701/54; 701/51
(58) Field of Search ............................. 701/51, 53, 54; 477/37, 110

(56) References Cited

U.S. PATENT DOCUMENTS 5,961,418 A * 10/1999 Taniguchi et al. ............ 477/43

FOREIGN PATENT DOCUMENTS

| JP | 9-210175 | 8/1997 |
|---|---|---|
| JP | 11-78619 | 3/1999 |

* cited by examiner

*Primary Examiner*—Michael J. Zanelli
(74) *Attorney, Agent, or Firm*—Foley & Lardner

(57) ABSTRACT

A target output shaft torque tTo is computed based on an accelerator pedal depression amount APS and a vehicle speed VSP, a torque ratio T is computed based on an input shaft rotation speed and a speed ratio factor E of a IVT (100), a target torque tTe of an engine (101) is computed from the target out shaft torque tTo and torque ratio T, and control is performed so that the torque generated by the engine (101) is the target torque tTe. At the same time, the target input shaft rotation speed tNin of the IVT (100) is calculated based on a vehicle running state, and control is performed so that the input shaft rotation speed Nin and target input shaft rotation speed tNin of the IVT coincide.

8 Claims, 18 Drawing Sheets

VEHICLE DRIVE FORCE CONTROL DEVICE

FIELD OF THE INVENTION

This invention relates to a vehicle drive force control device using an infinite speed ratio transmission (IVT).

BACKGROUND OF THE INVENTION

Tokkai Hei 11-78619 published by the Japanese Patent office in 1999 describes a combination of an engine controlled according to a target output shaft torque with a continuously variable transmission whereof a speed ratio can be continuously varied. In this construction, a target engine torque is computed from a target output shaft torque according to a vehicle running state and a speed ratio of the continuously variable transmission. Further, an electronically controlled engine throttle is driven so as to achieve an optimum fuel-cost performance.

Tokkai Hei 9-210175 published by the Japanese Patent office in 1999 describes an IVT which combines a continuously variable transmission with a reducing gear unit and a planetary gear set so as to control a speed ratio region of a continuously variable transmission up to infinity.

SUMMARY OF THE INVENTION

When the IVT of the aforesaid Tokkai Hei 9-210175 is combined with the drive controller of the aforesaid Tokkai Hei 11-78619, the following problem arises. The IVT selectively applies a power recirculation mode and a direct mode according to the speed ratio, but in the power recirculation mode wherein torque is recirculated from the continuously variable transmission to a reducing gear unit, the transmission efficiency of the IVT is less than in the direct mode.

Also, in the IVT, when the rotation speed of the IVT output shaft is zero, for example when the vehicle is in the stationary state, the IVT speed ratio becomes infinite. Herein, the IVT speed ratio is represented by 1/speed ratio factor, and the speed ratio factor is given by IVT output shaft rotation speed/IVT input shaft rotation speed. The case when the speed ratio=0, i.e. when the IVT speed ratio is infinite, is referred to as the geared neutral point (GNP). Therefore, it is possible to treat the infinite number when the target engine torque is computed using a microcomputer. For this reason, a special calculating routine is built into the microcomputer to handle the case when the IVT output shaft rotation speed is zero. As a result, in some cases, the computational load increases and the precision of the computation declines.

It is therefore an object of this invention to efficiently perform drive force control using an infinite speed ratio transmission. It is a further object of this invention to rapidly and precisely perform computational processing at the GNP.

In order to achieve above object, this invention provides a vehicle drive force control device. The vehicle drive force control device comprises: an infinite speed ratio transmission permitting continuous variation of a speed ratio up to infinity and is joined to a motor, running state detection sensors which detect a vehicle running state, an input shaft rotation speed sensor which detects a rotation speed of an input shaft of the infinite speed ratio transmission, an output shaft rotation speed sensor which detects a rotation speed of an output shaft of the infinite speed ratio transmission, and a microprocessor which controls the infinite speed ratio transmission and motor, wherein this microprocessor is programmed to: calculate a target output shaft torque based on a detection value of the running state detection sensors, compute a speed ratio factor of an input shaft rotation speed and an output shaft rotation speed as output shaft rotation speed/input shaft rotation speed, from the detection values of the input shaft rotation speed sensor and output shaft rotation speed sensor, compute a torque ratio of the infinite speed ratio transmission from this speed ratio factor, compute a target torque of the motor from the target output shaft torque of the infinite speed ratio transmission and the torque ratio, control the output of the motor according to this target torque, and compute a target input shaft rotation speed of the infinite speed ratio transmission based on a vehicle speed, and thereby control the speed ratio.

According to another aspect of this invention, a vehicle drive force control device comprises: an infinite speed ratio transmission permitting continuous variation of a speed ratio up to infinity and is joined to a motor, running state detection means for detecting a vehicle running state, means for detecting a rotation speed of an input shaft of the infinite speed ratio transmission, means for detecting a rotation speed of an output shaft of the infinite speed ratio transmission, means for calculating a target output shaft torque based on a detection value of the running state detection sensor, means for computing a speed ratio factor of an input shaft rotation speed and an output shaft rotation speed as an output shaft rotation speed/input shaft rotation speed, from the detection values of the input shaft rotation speed sensor and output shaft rotation speed sensor, means for computing a torque ratio of the infinite speed ratio transmission from this speed ratio factor, means for computing a target torque of the motor from the target output shaft torque of the infinite speed ratio transmission and the torque ratio, means for controlling the output of the motor according to this target torque, and means for computing a target input shaft rotation speed of the infinite speed ratio transmission based on a vehicle speed, and thereby control the speed ratio.

DETAILED DESCRIPTION OF THE INVENTION

Figure 1:
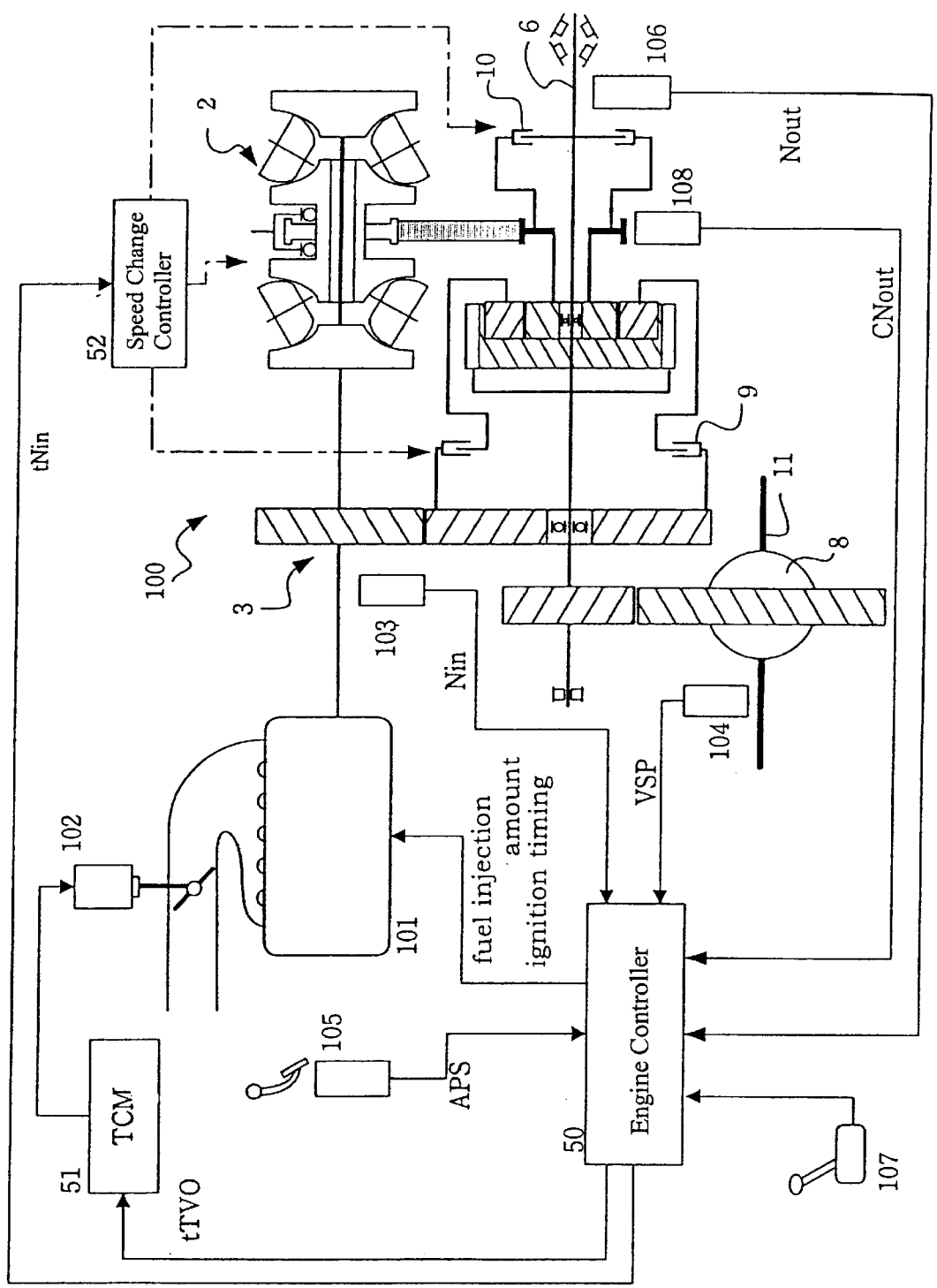
FIG. 1 is a schematic view of a drive force control device according to this invention.

Referring to FIG. 1, a drive force control device according to this invention controls an engine 101 (motor) comprising an electronically controlled throttle valve 102, and an infinite speed ratio transmission (IVT) 100 using a toroidal CVT 2, by means of a control unit 50 comprising a microcomputer.

Figure 2:
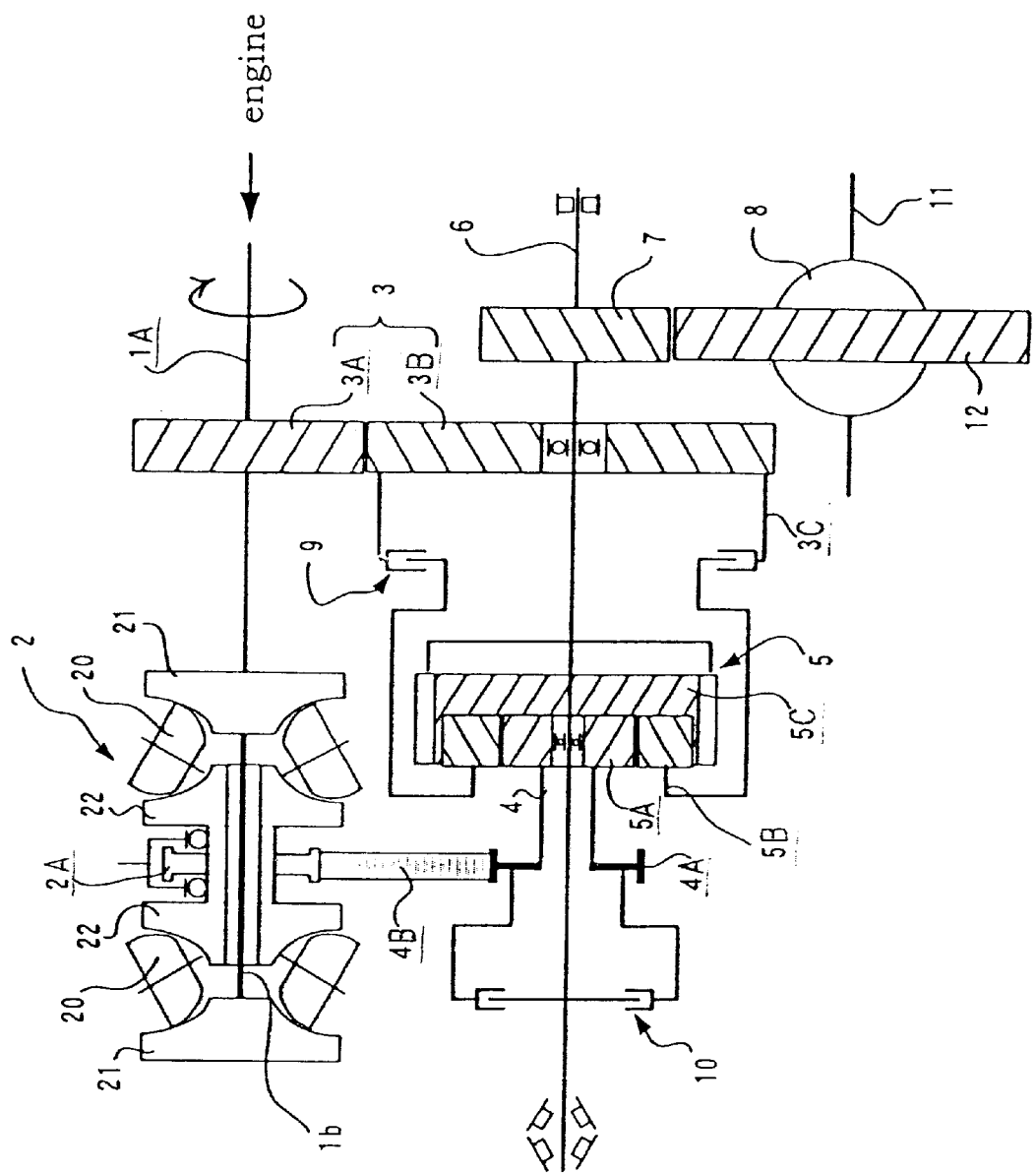
FIG. 2 is a schematic view of an IVT applied to a drive force control device.

Referring to FIG. 2, the IVT 100 is an infinite speed ratio transmission comprising the CVT 2, a fixed speed ratio transmission 3, an IVT input shaft 1A, an IVT output shaft 6, a power recirculation mode clutch 9 and a direct mode clutch 10. The IVT input shaft 1A is joined to the crank shaft, not shown, of the engine 101. The CVT 2 whereof a speed ratio I can be continuously varied is joined to the IVT input shaft 1A. Further, the fixed speed ratio transmission 3 (reducing gear unit) is joined to the CVT 2 in parallel. The fixed speed ratio transmission 3 comprises a gear 3A and gear 3B. The CVT 2 and the fixed speed ratio transmission 3 have output shafts 4, 3C disposed on the side of the IVT output shaft 6 and are joined via a planetary gear set 5.

An output shaft 4 of the CVT 2 is coaxial with the IVT output shaft 6, and is supported free to rotate relative to it. The CVT output shaft 4 is joined to the IVT output shaft 6 via an output sprocket 2A, a chain 4B and a sprocket 4A on the CVT 2. One end of the CVT output shaft 4 is joined to a gear 5A of the planetary gear set 5. The other end is joined to the direct mode clutch 10.

The output shaft 3C of the fixed speed ratio transmission 3 is joined to the gear 3B. The output shaft 3C of the fixed speed ratio transmission 3 is coaxial with the IVT output shaft 6, and is supported free to rotate relative to it. The output shaft 3C is joined to a carrier 5B of the planetary gear set 5 via the power recirculation mode clutch 9. A ring gear 5C of the planetary gear set 5 is joined to the IVT output shaft 6.

A transmission output gear 7 is provided on the right-hand side of the IVT output shaft 6 in the figure. This transmission output gear 7 meshes with a final gear 12 of a differential gear 8. A drive force, determined from input torque to the IVT and a speed ratio factor E according to the speed ratio I of the CVT 2 and the running mode, is transmitted to drive wheels 11 joined to the differential gear 8. The IVT speed ratio is represented by 1/speed ratio factor, and the speed ratio factor is given by IVT output shaft rotation speed/IVT input shaft rotation speed.

The CVT 2 comprises two sets of toroidal units. Each unit is provided with an input disk 21 and output disk 22, and a pair of power rollers 20 gripped between these disks. The power rollers 20 are supported free to rotate by trunnions, not shown. The input disk 21 is connected via a CVT shaft 1B.

When an actuator of a speed change control mechanism 52 drives the trunnions, a gyration angle of the power rollers varies. Therefore, the speed ratio I of the CVT 2 and the speed ratio factor E of the IVT 100 vary continuously.

The running mode of the IVT 100 is selectively set to either one of a power recirculation mode and a direct mode. The power recirculation mode is a mode wherein the power recirculation mode clutch 9 is engaged, and the direct mode clutch 10 is disengaged. In the power recirculation mode, the speed ratio factor E can be varied continuously from a positive speed ratio factor for forward running to a negative speed ratio factor for reverse running via zero namely GNP, according to a difference between the speed ratio of the CVT 2 and the fixed speed ratio transmission 3.

On the other hand, the direct mode is a mode wherein the power recirculation clutch 9 is disengaged and the direct mode clutch 10 is engaged. In the direct mode, speed ratio control is performed according to the speed ratio I of the CVT 2.

Next, the control unit 50 controls the engine 101 and IVT 100. The control unit 50 comprises a microcomputer as its main component.

The signals input to this control unit 50 are an accelerator depression amount APS from an accelerator pedal depression sensor 105, a select signal from a range selector lever 107 which changes over a speed ratio range of the IVT 100, a vehicle speed VSP detected by a vehicle speed sensor 104, the rotation speed Nin of the IVT input shaft 1A of the IVT 100 detected by an input shaft rotation speed sensor 103, and the rotation speed Nout of the IVT output shaft 6 detected by an output shaft rotation speed sensor 106. The control unit 50 controls the fuel injection amount, an ignition timing of the engine 101 and speed change of the IVT 100 so as to obtain a target output shaft torque tTo computed according to the vehicle running state. In this way, the control unit 50 controls the drive force of the vehicle.

For this purpose, the electronically controlled throttle valve 102 which is opened and closed by an actuator, is interposed in the intake air passage of the engine 101. A throttle control module (TCM) 51 controls the opening of the electronically controlled throttle valve 102 based on a throttle valve opening signal tTVO sent by the control unit 50. Therefore, the control unit 50 can control the torque generated by the engine 101.

The IVT 100 also continuously varies the speed ratio factor E according to a speed change command from the control unit 50. For example, the target input shaft rotation speed tNin of the IVT 100 is computed from the target output shaft torque tTo determined according to the vehicle running state, and the vehicle speed VSP. The control unit 50 controls the IVT speed ratio so that a speed ratio factor E according to this target input shaft rotation speed tNin is obtained.

Figure 3:
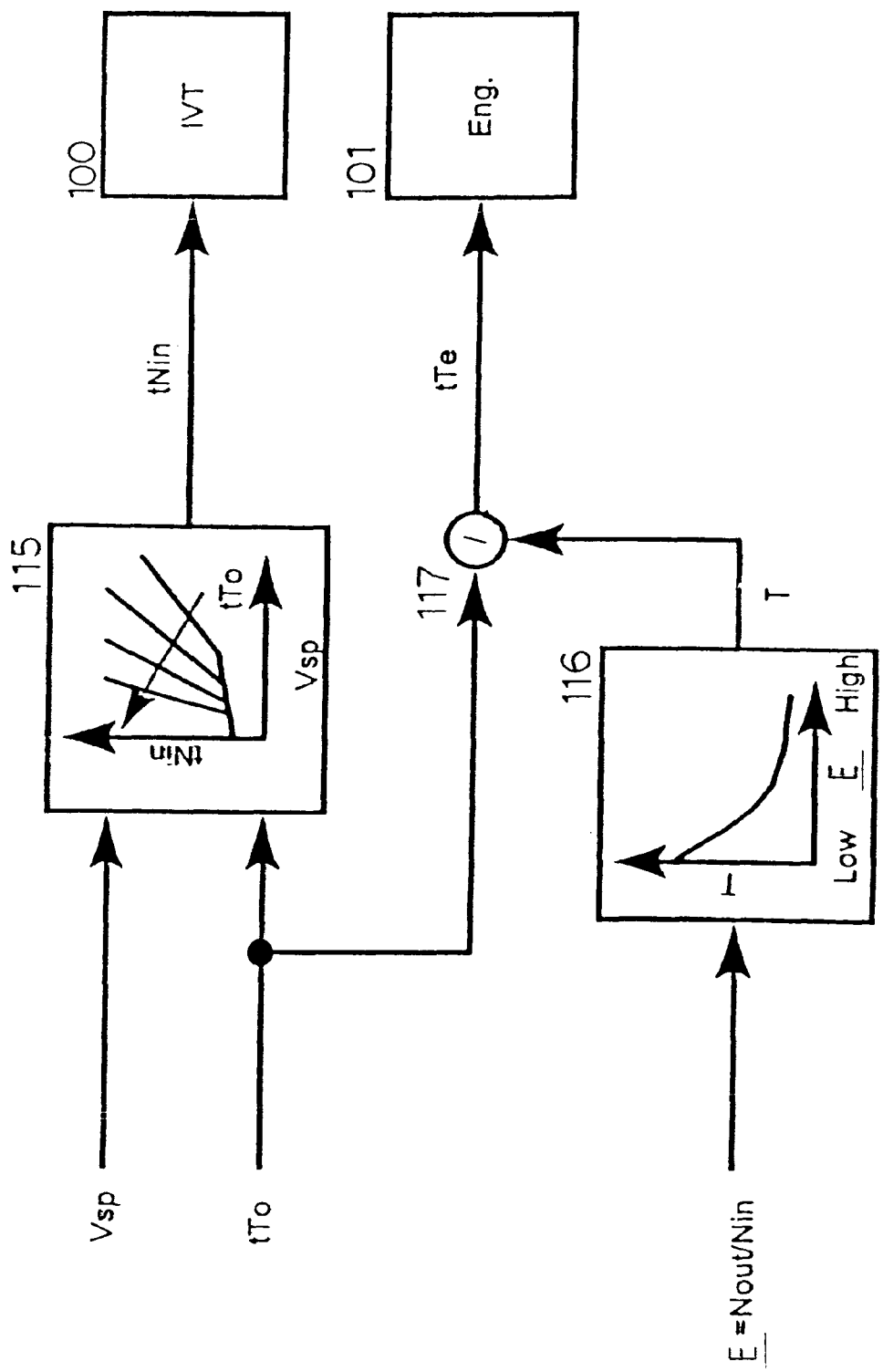
FIG. 3 is a block diagram describing a drive force control performed by a control unit according to this invention.
Figure 7:
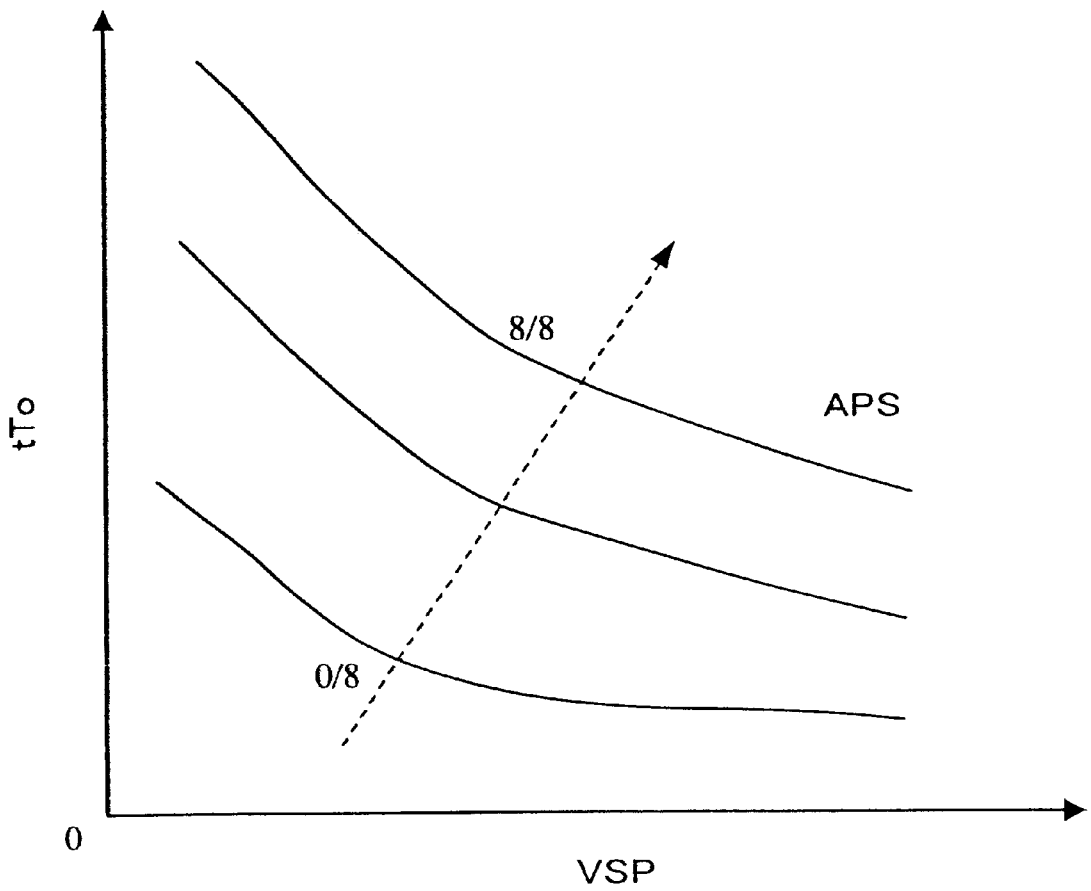
FIG. 7 is a map of a target output shaft torque tTo stored by the control unit.

Referring to FIG. 3, the computation of the target output shaft torque tTo is identical to that disclosed in the Tokkai Hei 11-78619 of the aforesaid prior art. Referring to FIG. 7, the target output shaft torque tTo is determined from a preset map according to the accelerator depression amount APS and the vehicle speed VSP.

The speed ratio control first computes the target input shaft rotation speed tNin based on a preset target input shaft rotation speed map 115 from the detected value of the vehicle speed VSP and the target output shaft torque tTo. Next, the IVT speed ratio is controlled so that the real IVT input shaft rotation speed Nin coincides with this target input shaft rotation speed tNin.

On the other hand, referring to FIG. 3, the torque control of the engine 101 computes a target engine torque tTe generated by the engine 101. To find the target engine torque tTe, the speed ratio factor E of the IVT 100 is first calculated. The torque ratio T is computed based on a preset torque ratio map 116 from the speed ratio factor E. Next, the target output shaft torque tTo is divided by this torque ratio T using a divider 117 to calculate the target engine torque tTe. The control unit 50 sets the opening tTVO of the electronically controlled throttle valve 102 and performs adjustment of fuel injection amount and ignition timing so that the torque generated by the engine 101 coincides with this target engine torque tTe.

The divider 117 is a virtual unit for the purpose of describing the function of the control unit 50 comprising a microprocessor, and it does not exist physically.

Figure 4:
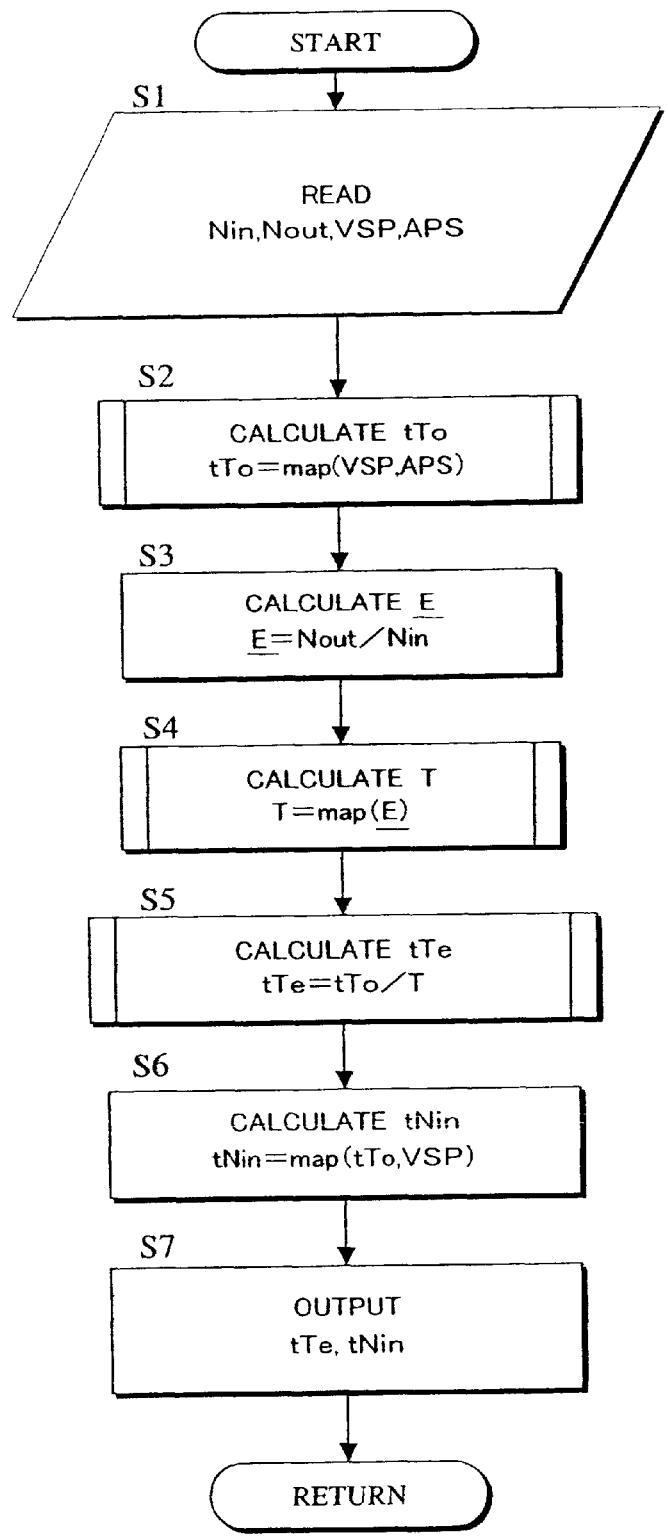
FIG. 4 is a flowchart describing a drive force control routine performed by the control unit according to this invention.

Next, the drive force control routine performed by the control unit 50 will be described referring to the flowchart of FIG. 4. The flowchart of FIG. 4 is performed at a predetermined interval, for example, 10 msec.

First, in a step S1, the rotation speed Nin of the IVT input shaft 1A of the IVT 100, rotation speed Nout of the IVT output shaft 6, vehicle speed VSP detected by the vehicle speed sensor 104, and the accelerator depression amount APS, are read in the control unit 50.

In a step S2, the target out shaft torque tTo is computed from the vehicle speed VSP and accelerator depression amount APS based on the map shown in FIG. 7.

Next, in a step S3, the speed ratio factor E of the IVT input shaft 1A and IVT output shaft 6 is computed by the following equation.

$$E = Nout/Nin \quad (1)$$

Figure 5:
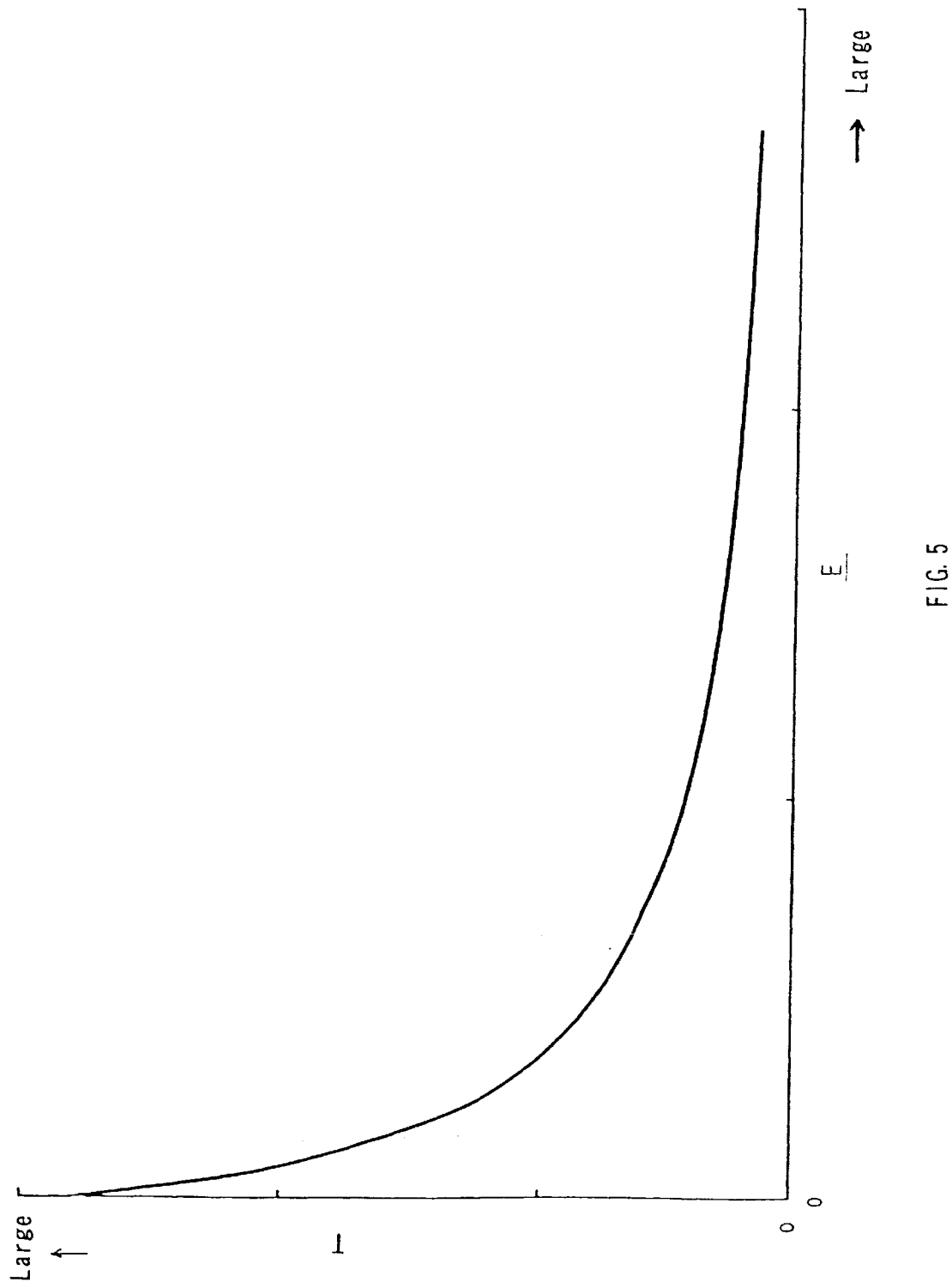
FIG. 5 is a map showing a relation between a speed ratio factor E and a torque ratio T stored by the control unit.

Referring to FIG. 5, in a step S4, the torque ratio T of the IVT 100 is computed from this speed ratio factor E based on a preset map.

In a step S5, the target output shaft torque tTo is divided by this torque ratio T to compute the target engine torque tTe.

$$tTe = tTo/T \quad (2)$$

Figure 6:
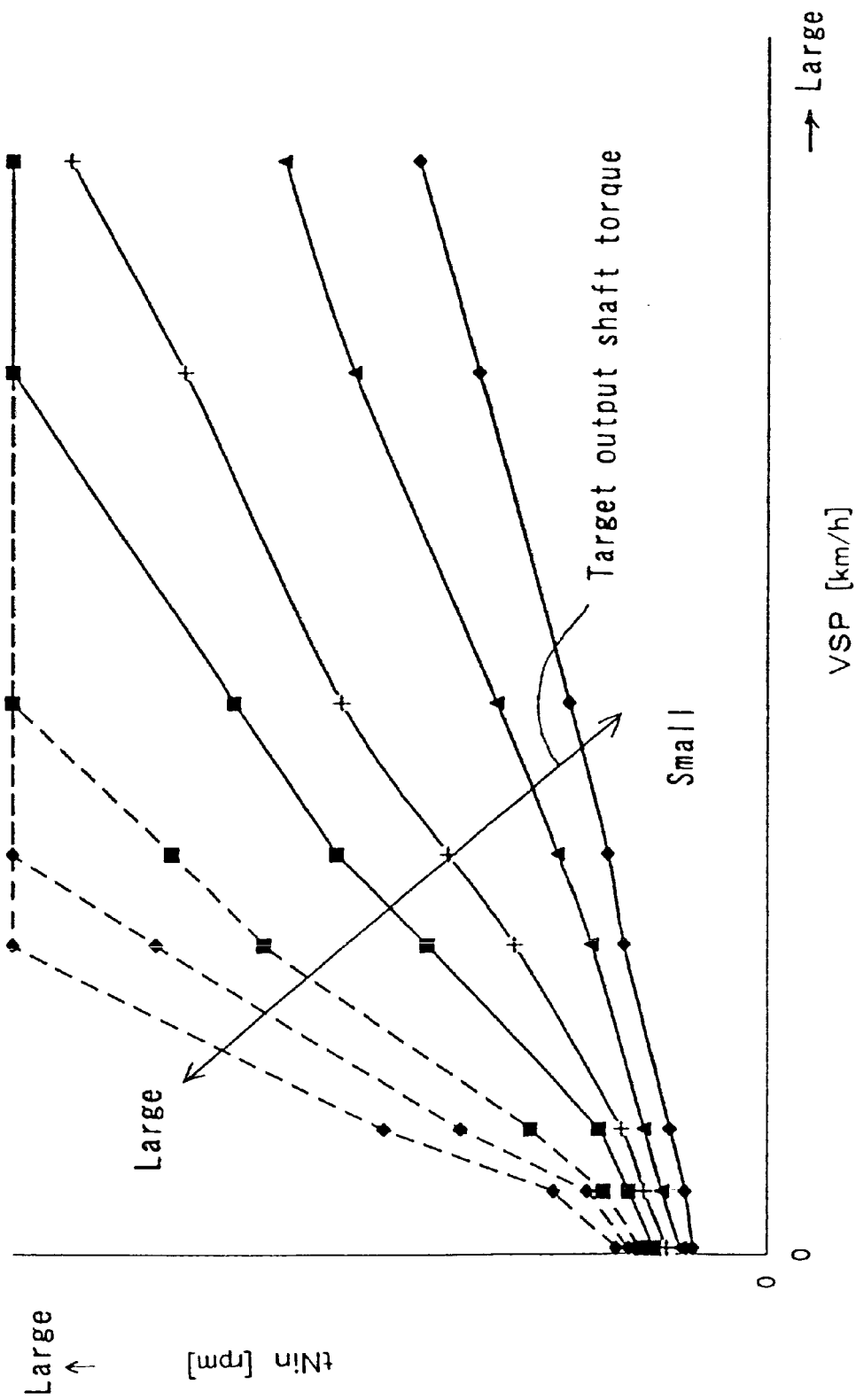
FIG. 6 is a map of a target input shaft rotation speed tNin stored by the control unit.

Next, referring to FIG. 6, in a step S6, the target input shaft rotation speed tNin is computed according to the vehicle speed VSP which is in direct proportion to the transmission output shaft rotation speed from a preset map using the target output shaft torque tTo as a parameter. The target input shaft rotation speed tNin is equal to the engine rotation speed.

In a step S7, the computed target input shaft rotation speed tNin and target engine torque tTe are outputted. The control unit 50 commands the target input shaft rotation speed tNin to the speed change control mechanism 52, and controls the engine 101 to obtain the target engine torque tTe. The control unit 50 computes the target opening tTVO, and drives the electronically controlled throttle valve 102.

As described above, according to this invention, the target output shaft torque tTo is divided by the torque ratio T which shows the transmission efficiency of the IVT 100 to calculate the target engine torque tTe. As a result, the target output shaft torque tTo and vehicle speed VSP, i.e., the target input shaft rotation speed tNin of the IVT 100 relative to the vehicle horsepower, and hence the engine rotation speed, can be controlled. Therefore, the output shaft torque of the IVT 100 can be controlled while controlling the operating point of the engine 101 so that optimum fuel cost-performance and emissions are obtained.

Here, the reason why the target input shaft rotation speed tNin can be controlled to obtain optimum fuel-cost performance and optimum emissions, will be described in more detail.

When the input shaft rotation speed of the transmission is determined relative to a given target output shaft torque tTo and vehicle speed VSP, the speed ratio factor E of the transmission is calculated from the input shaft rotation speed of the transmission. The torque ratio T of the transmission can be calculated from this speed ratio factor E.

The target engine torque tTe can then be calculated from this torque ratio T and target output shaft torque tTo.

Specifically, a combination of the target input shaft rotation speed tNin and engine torque tTe can be found, considering the efficiency of the transmission, relative to the target output shaft rotation speed tTo at a given vehicle speed VSP.

Many such combinations exist. Of these, the best combinations from the viewpoint of fuel cost-performance and from the viewpoint of minimizing emissions such as a NOx, are set in a map of target input shaft rotation speed.

From this, the target input shaft rotation speed tNin of the transmission which gives minimum fuel consumption and optimum emissions can be calculated taking account of the efficiency of the transmission.

If the transmission efficiency of the IVT in the direct mode and power recirculation mode is different even at the same speed ratio of the CVT 2, the target engine torque tTe is determined according to the torque ratio T. Therefore, it is possible to determine the target engine torque tTe with high precision. Due to this control, a decrease of the output shaft torque of the transmission in the power recirculation mode can be prevented, and precision of drive force control using the IVT 100 can be improved.

When the torque ratio T is computed, as a map was looked up using the speed ratio factor E, the speed ratio factor E can be treated as a finite value. At the GNP described in the aforesaid prior art example, the speed ratio factor E=0, and special processing to deal with infinity in the computation is unnecessary. Therefore, the computational load of the microcomputer is reduced, and decline of computational precision can be prevented.

Figure 8:
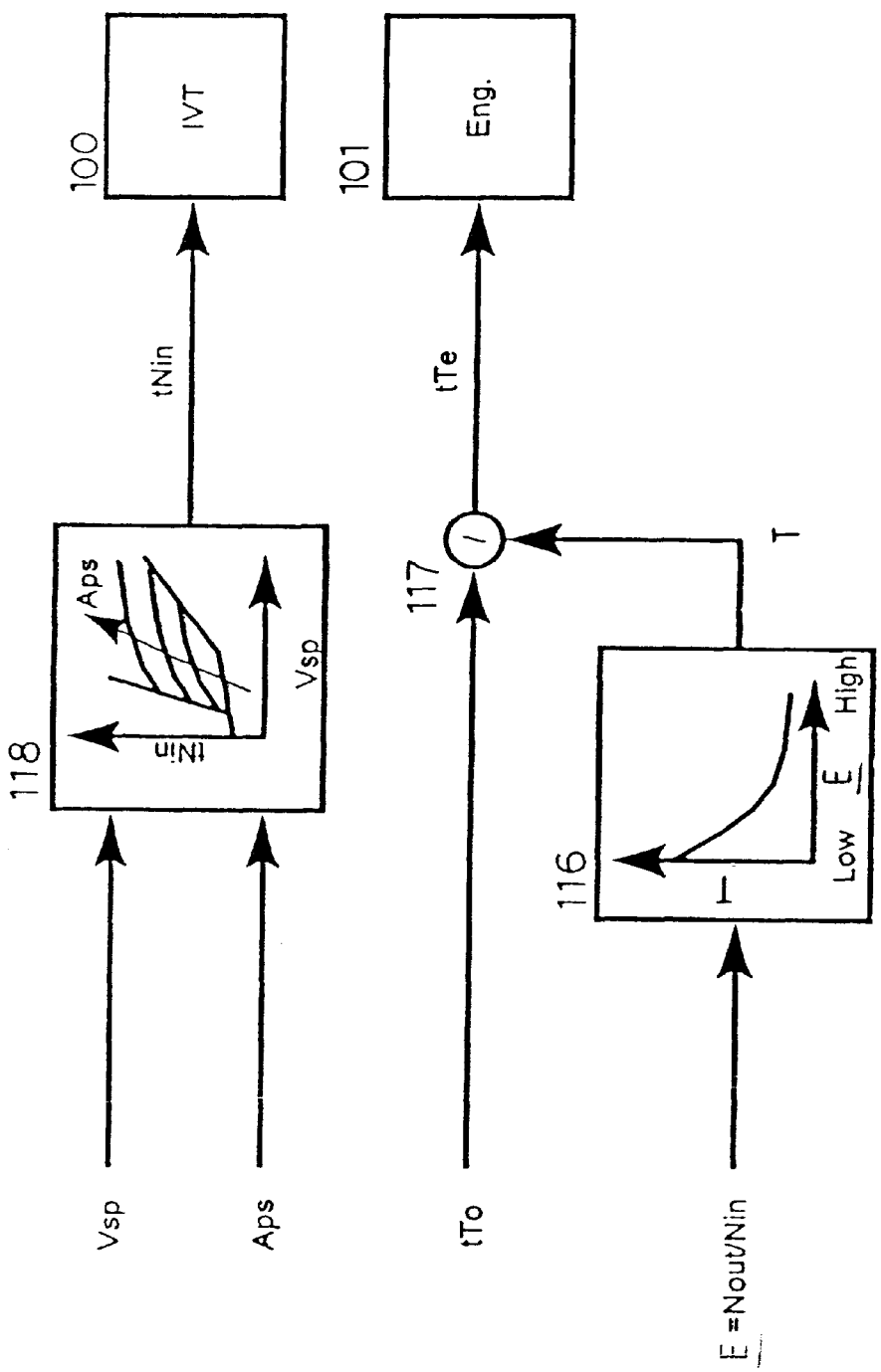
FIG. 8 is similar to FIG. 3, but showing a second embodiment and describing the drive force control performed by the control unit according to this invention.
Figure 9:
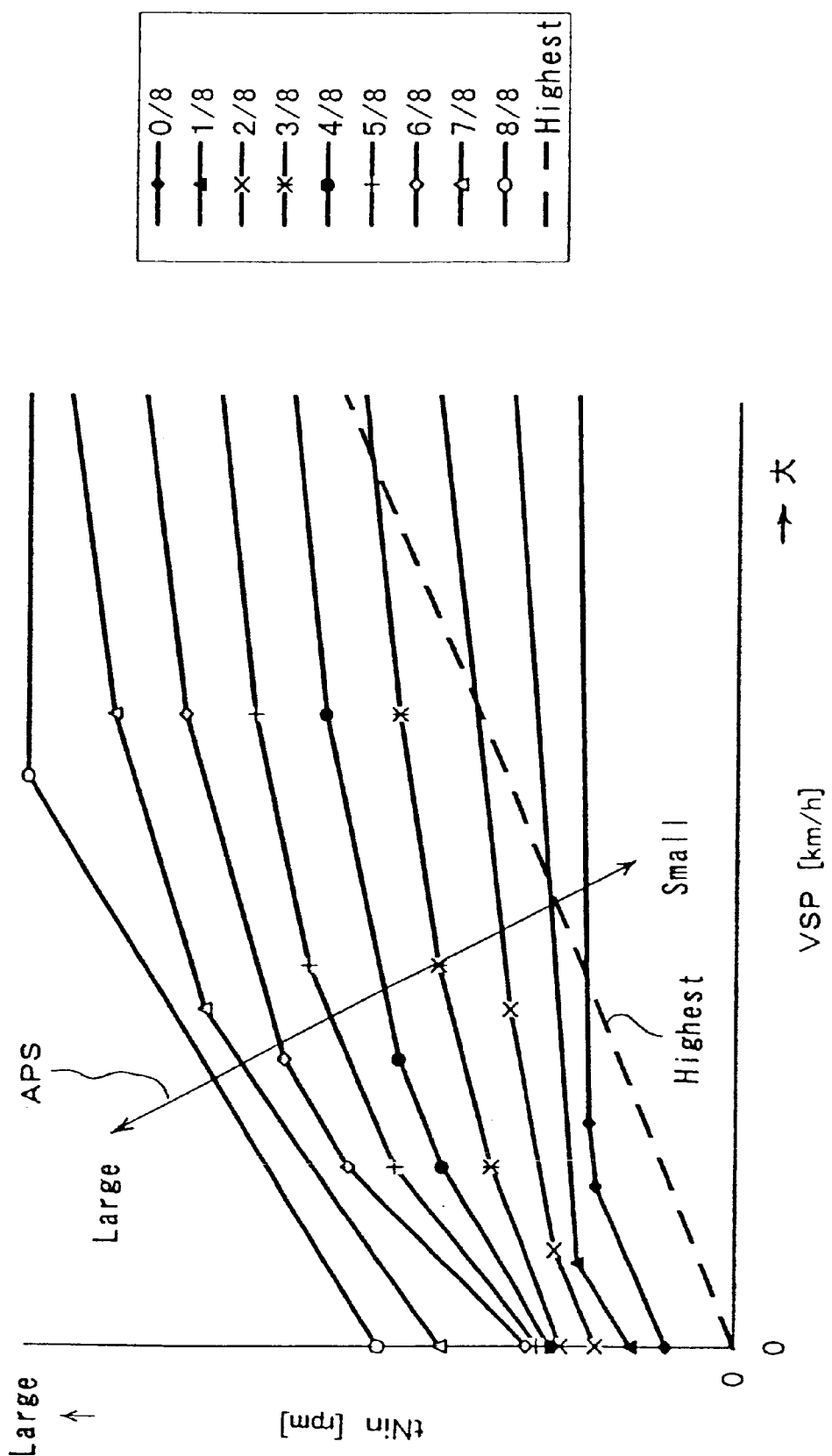
FIG. 9 is a map of the target input shaft rotation speed tNin stored by the control unit according to the second embodiment.
Figure 10:
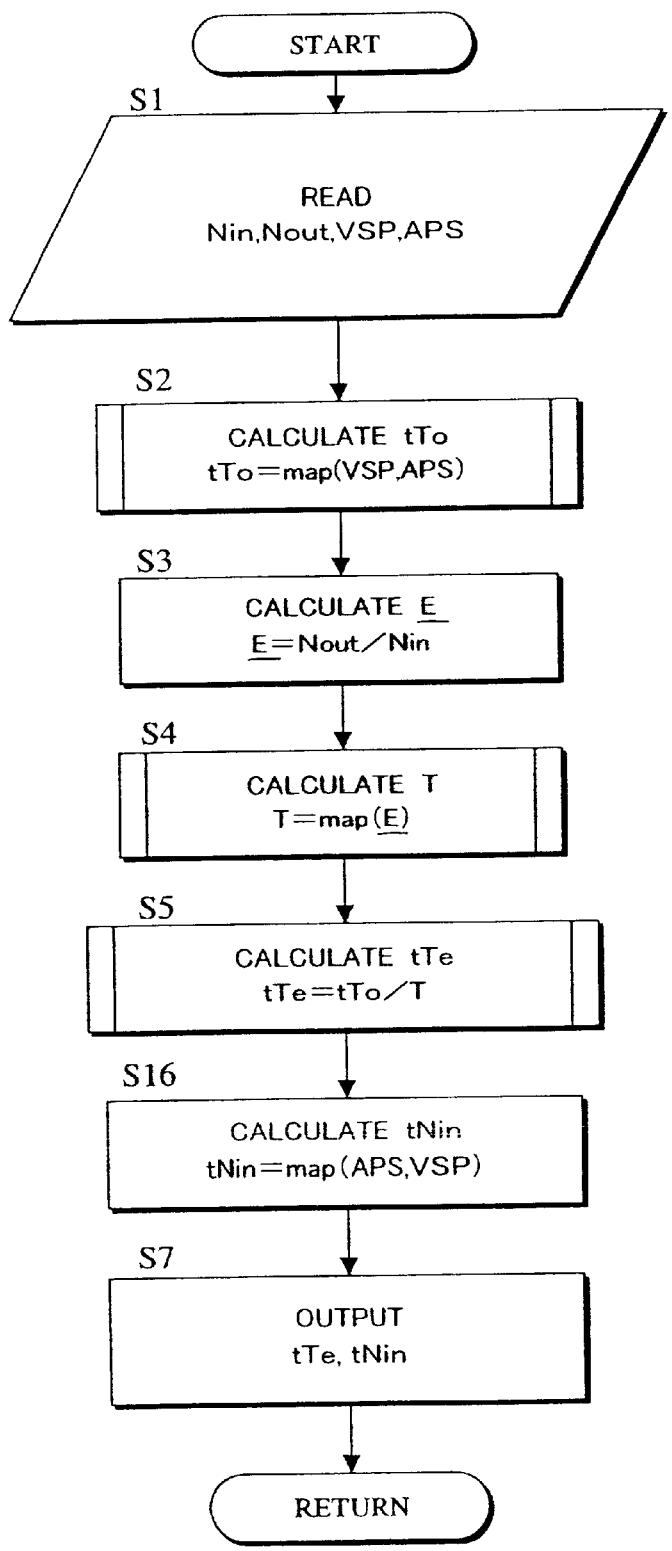
FIG. 10 is similar to FIG. 4, and is a flowchart describing a drive force control routine performed by the control unit according to the second embodiment.

FIG. 8 to FIG. 10 show a second embodiment. According to this embodiment, the computation of target input shaft rotation speed tNin performed in the step S6 of the first embodiment is replaced by a step S16 wherein this is done by a map according to the accelerator depression amount APS and vehicle speed VSP. The remaining features are identical to those of the first embodiment.

The step S16 of FIG. 10 sets the target input shaft rotation speed tNin by a preset map shown in FIG. 9 using the accelerator depression amount APS as a parameter. The remaining steps are identical to FIG. 4 of the first embodiment.

In this case, the target input shaft rotation speed tNin= engine rotation speed can be determined according to a driver accelerator operation. Hence, the output shaft torque of the IVT 100 can be controlled while varying the engine rotation speed without giving an unpleasant feeling to the driver.

Figure 11:
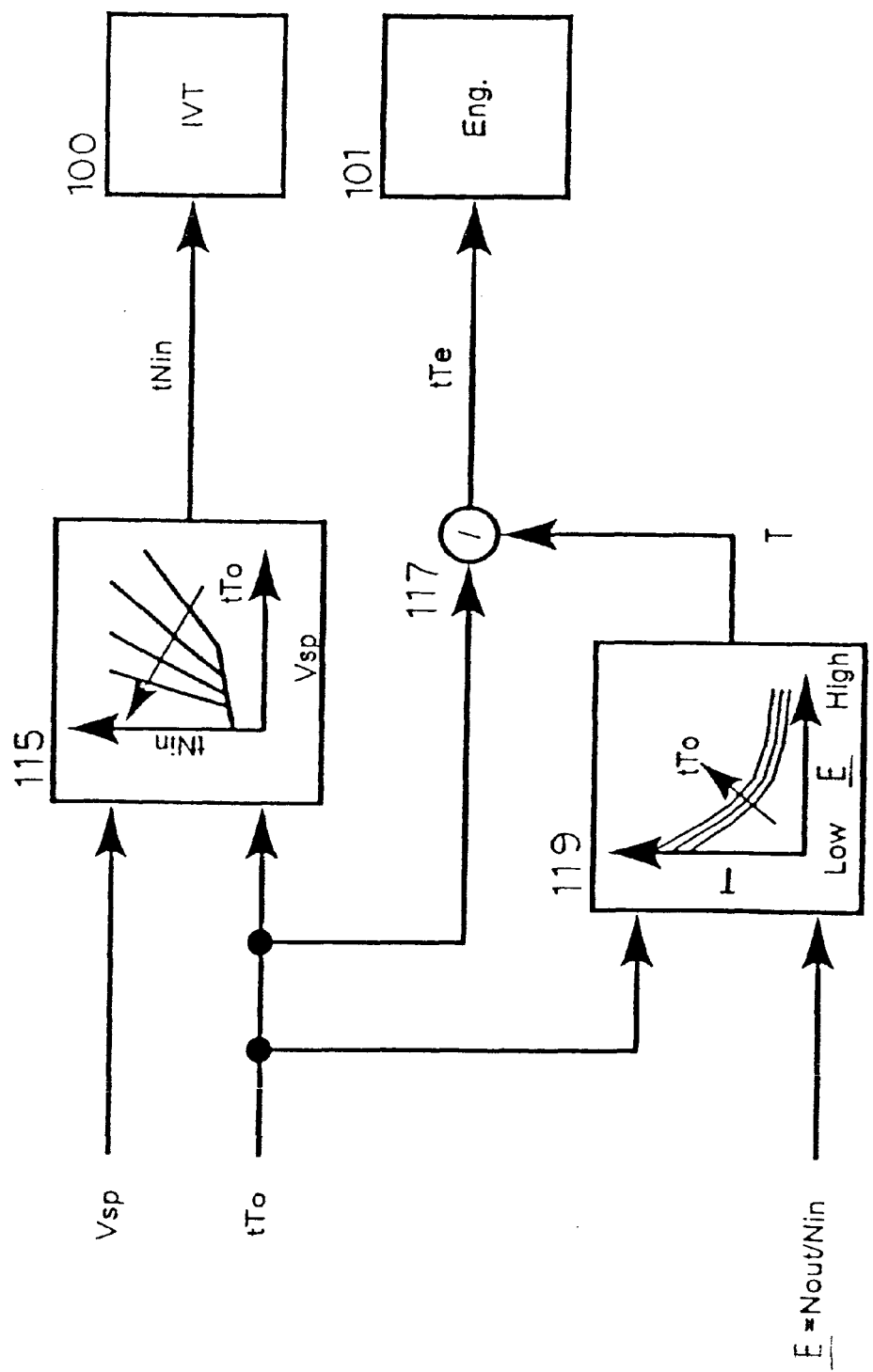
FIG. 11 is similar to FIG. 3, but showing a third embodiment, and describing a drive force control performed by the control unit according to this invention.
Figure 12:
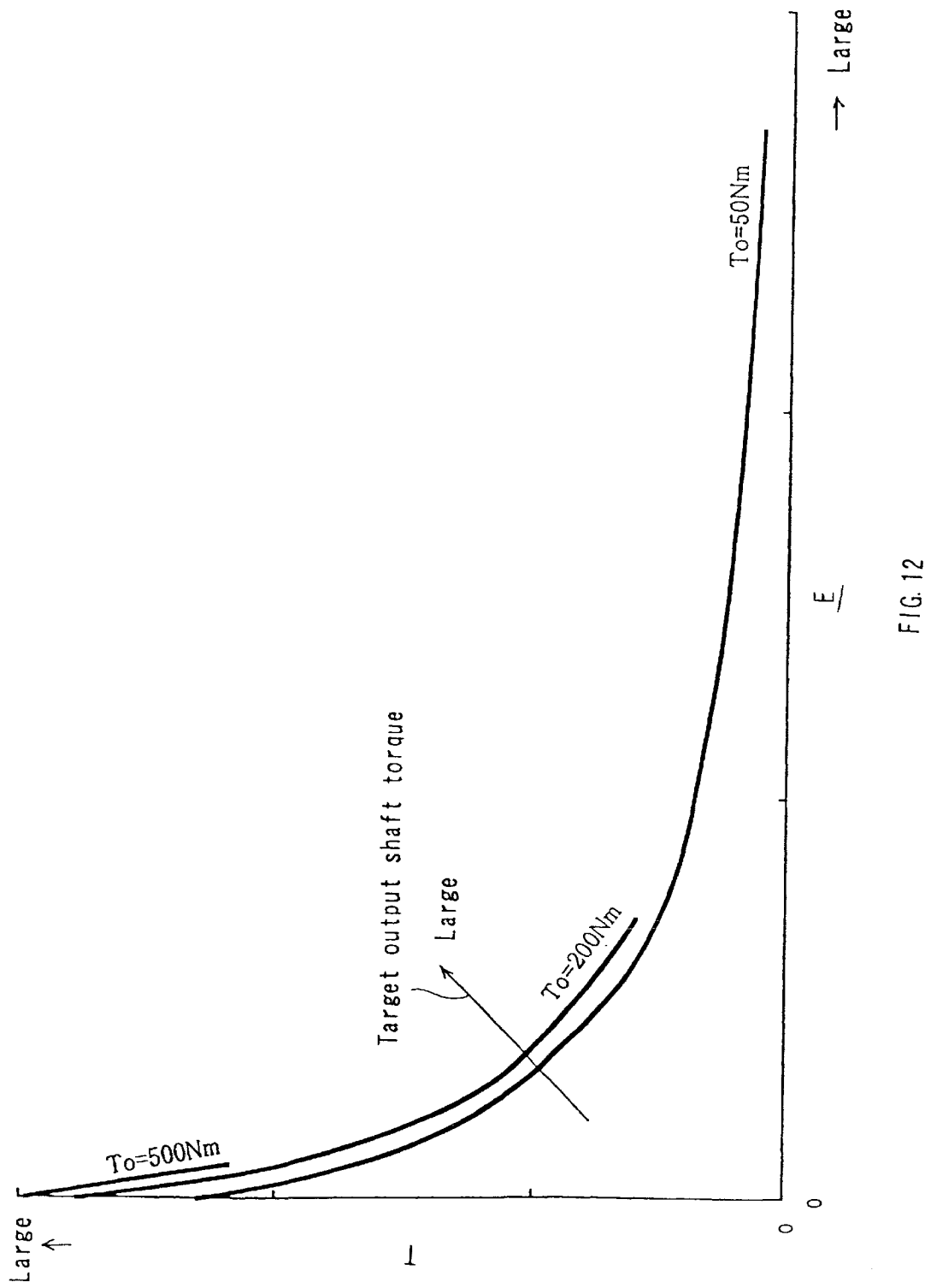
FIG. 12 is a map showing a relation between the speed ratio factor E and torque ratio T stored by the control unit according to third embodiment.
Figure 13:
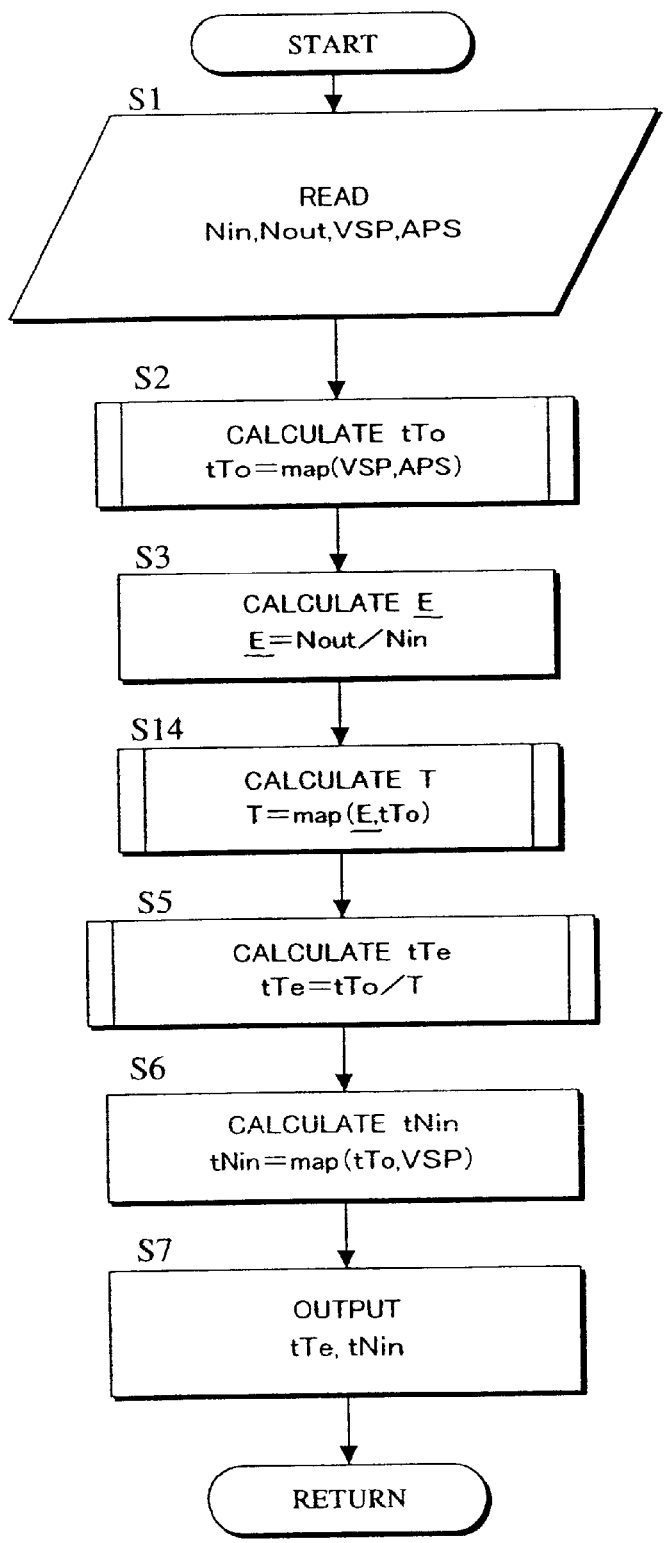
FIG. 13 is similar to FIG. 4, and is a flowchart describing a drive force control routine performed by the control unit according to the third embodiment.

FIG. 11–FIG. 13 show a third embodiment. Here, the computation of the torque ratio T performed in the step S4 of the first embodiment is replaced by a step S14 which sets the torque ratio T corresponding to the speed ratio factor E of the input/output shafts. The torque ratio Tis computed using the target output shaft torque tTo as a parameter as shown in the map of FIG. 11 and FIG. 12. The remaining features are identical to those of the first embodiment.

In the step S14, the torque ratio T is computed using the speed ratio factor E and target output shaft torque tTo as parameters, as shown in the map of FIG. 12.

In this case, the torque ratio T can be computed with a higher degree of precision, and the precision of computing the target engine torque tTe can be improved.

Figure 14:
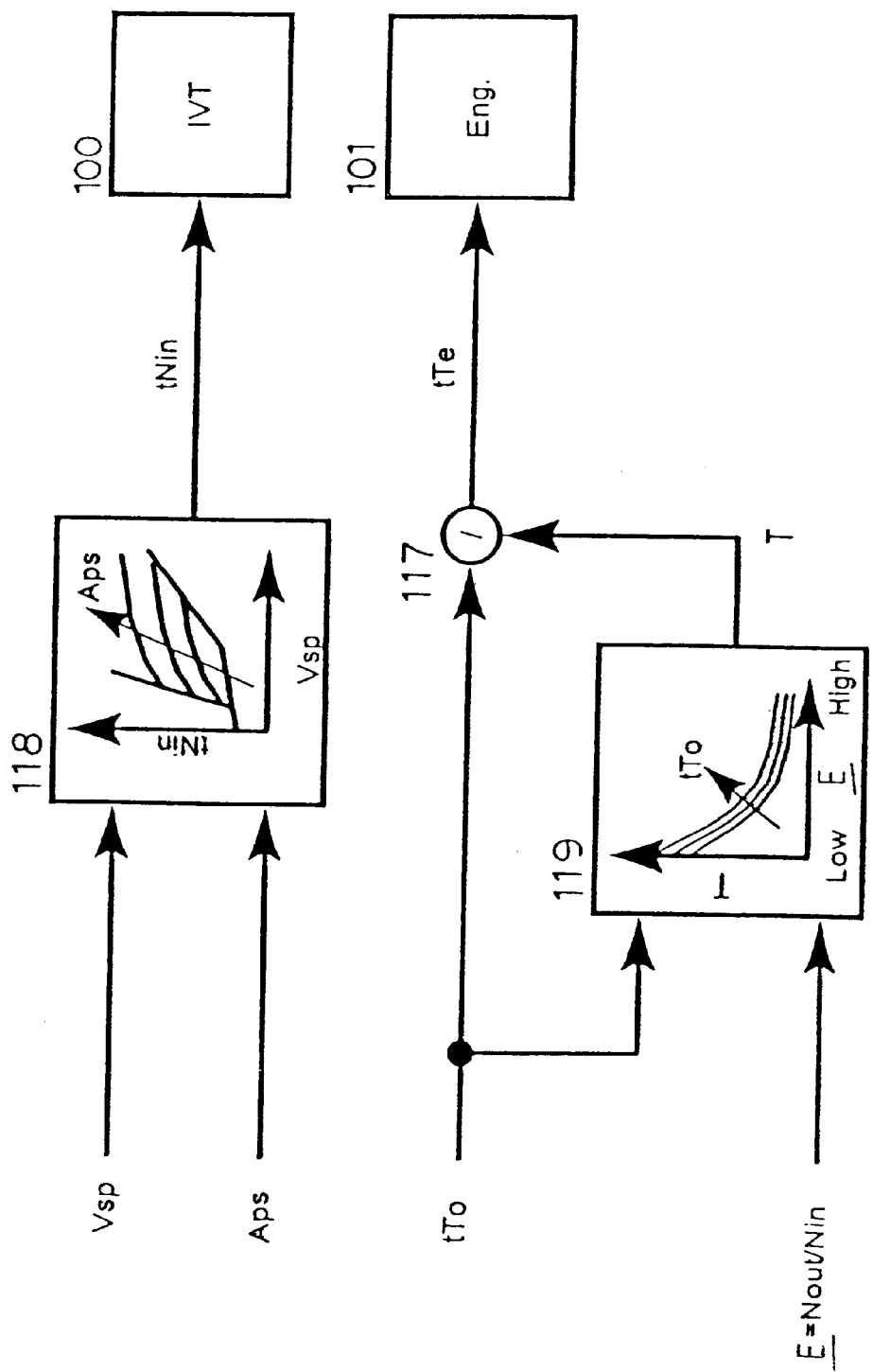
FIG. 14 is similar to FIG. 3, but showing a fourth embodiment, and is a block diagram describing a drive force control performed by the control unit according to this invention.
Figure 15:
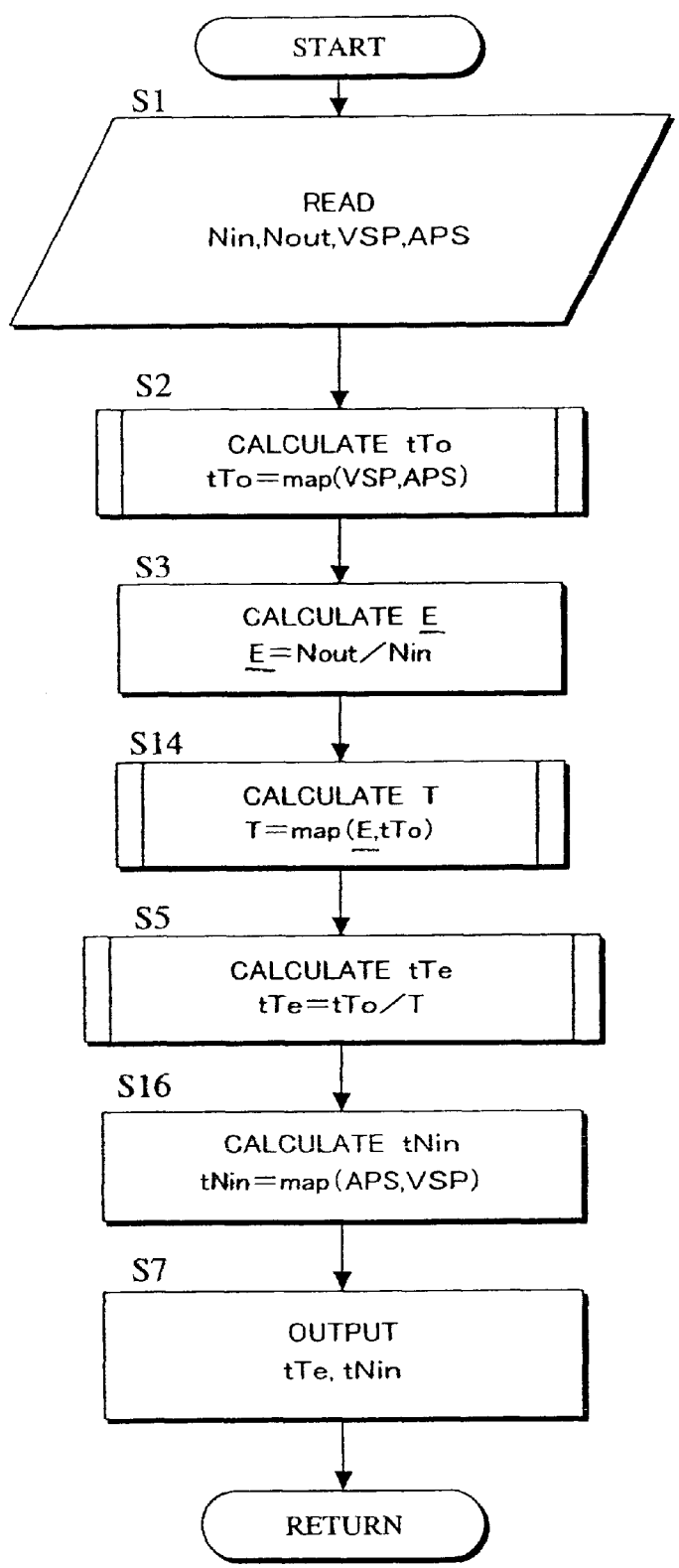
FIG. 15 is similar to FIG. 4, and is a flowchart describing a drive force control routine performed by the control unit according to the fourth embodiment.

FIG. 14–FIG. 15 show a fourth embodiment. Here, the computation of the torque ratio T performed in the step S4 of the second embodiment is replaced by the step S14 which sets the torque ratio T relative to the speed ratio factor E of the input/output shafts. As in the case of the third embodiment, the torque ratio T is computed using the target output shaft torque tTo as a parameter, as shown in FIG. 11 and FIG. 12. The remaining features are identical to those of the second embodiment.

In this case, the target input shaft rotation speed tNin= engine rotation speed can be determined according to a driver accelerator operation. Hence, the torque ratio T can be computed with a higher degree of precision while varying the engine rotation speed without giving an unpleasant feeling to the driver. Therefore, the precision of computing the target engine torque tTe can be improved, and the output shaft torque of the IVT 100 can be controlled with high precision.

Figure 16:
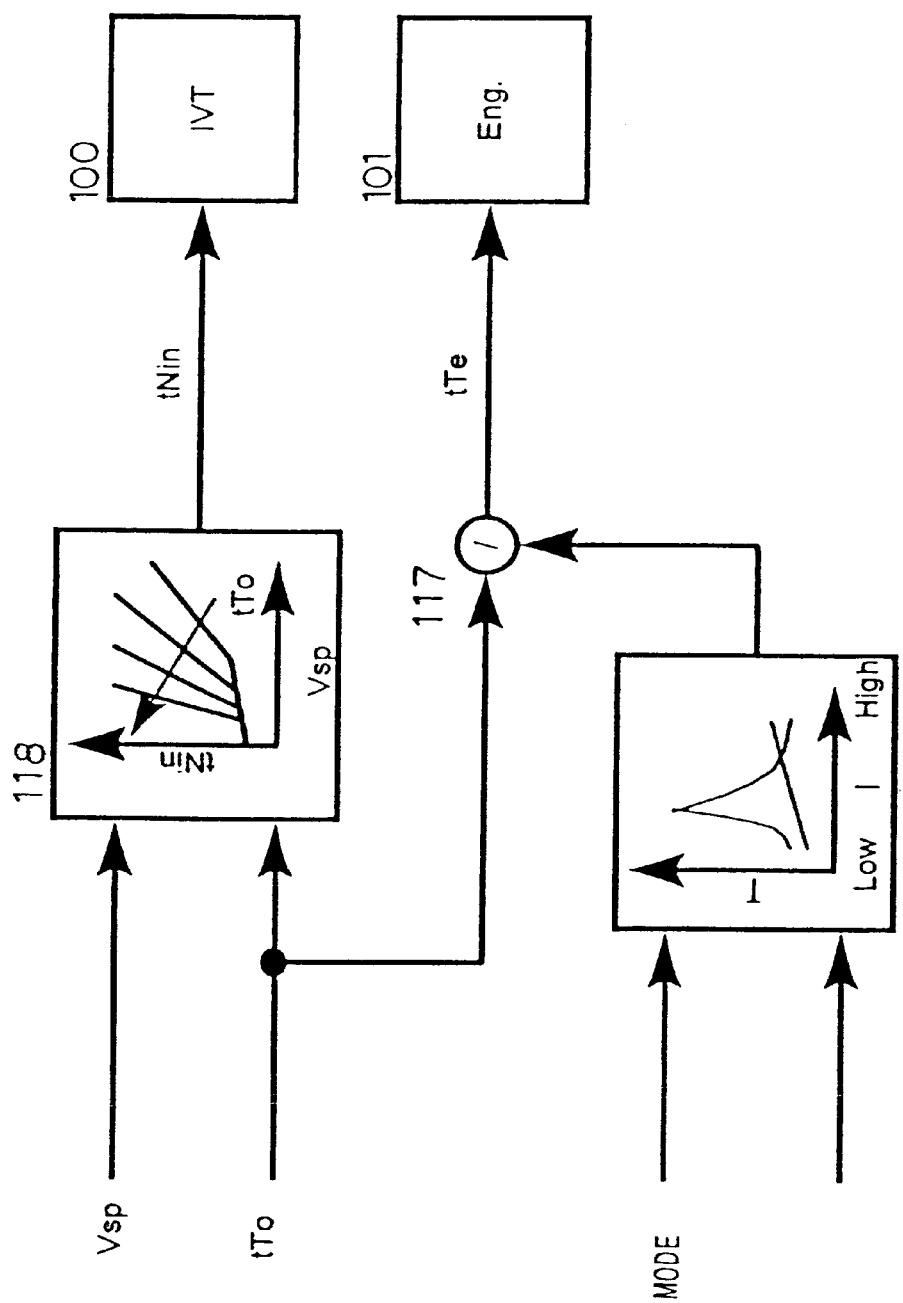
FIG. 16 is similar to FIG. 3, but showing a fifth embodiment, and is a block diagram describing a drive force control performed by the control unit according to this invention.
Figure 17:
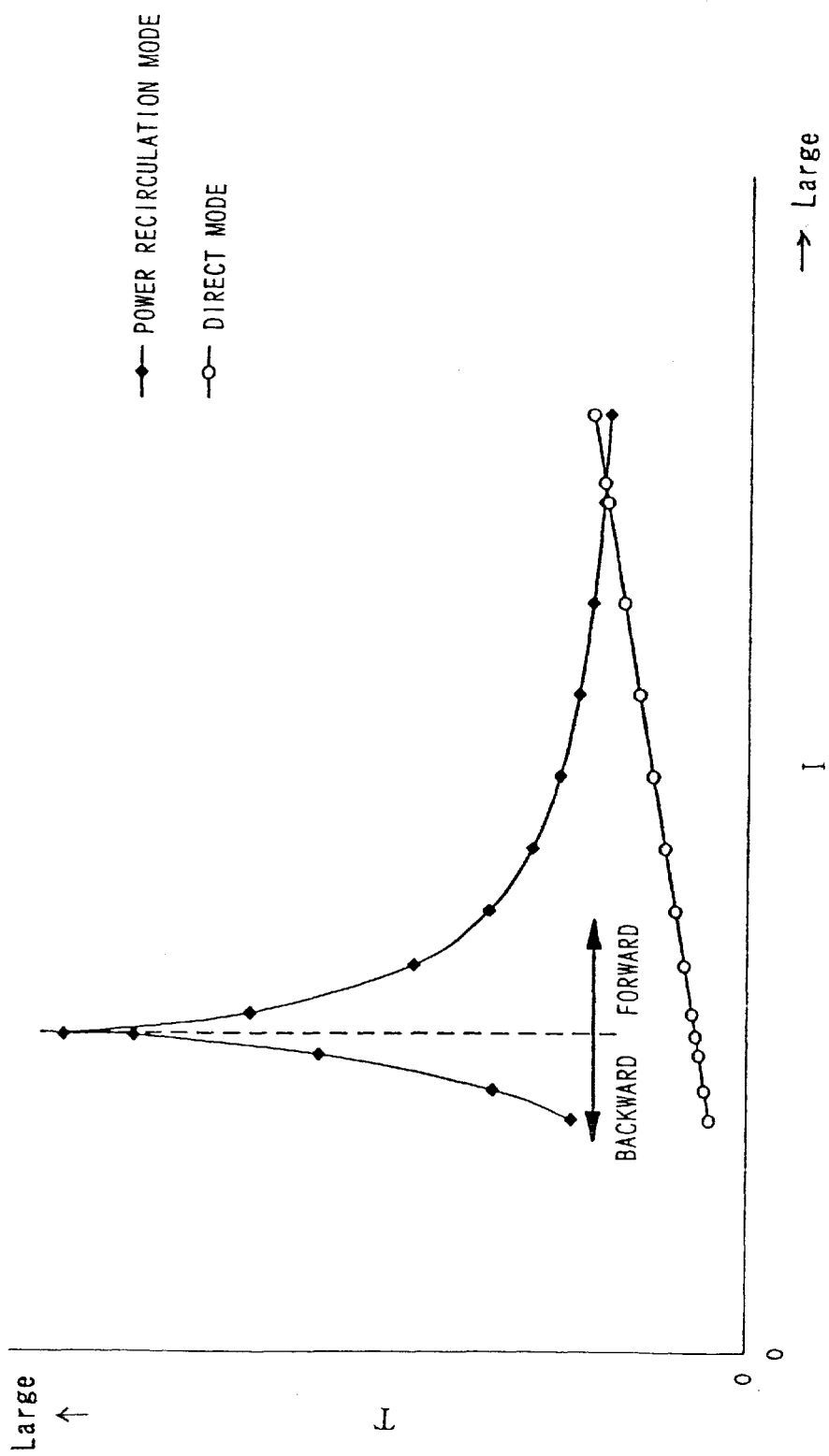
FIG. 17 is a map showing a relation between a speed ratio I of a continuously variable transmission and a torque ratio T stored by the control unit according to a running mode in the fifth embodiment.
Figure 18:
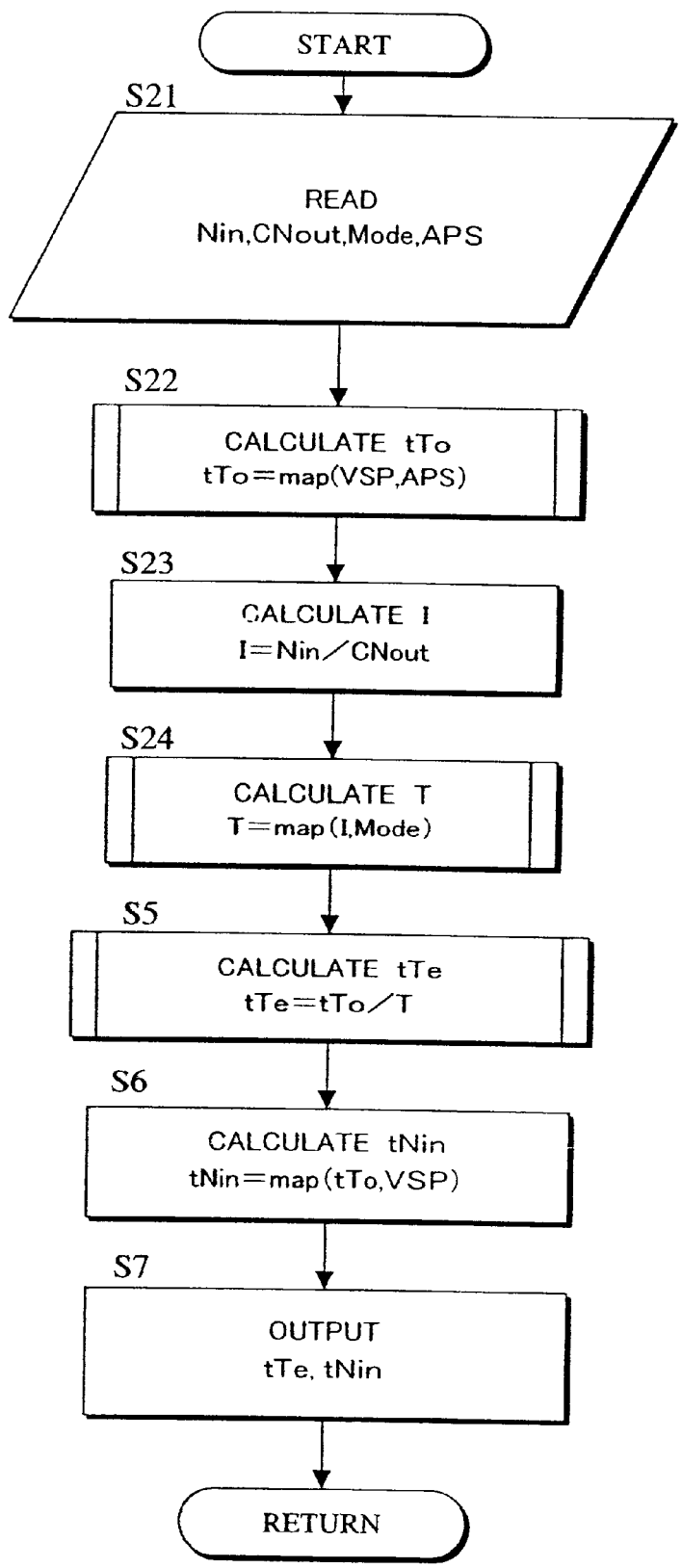
FIG. 18 is similar to FIG. 4, and is a flowchart describing a drive force control routine performed by the control unit according to the fifth embodiment.

FIG. 16–FIG. 18 show a fifth embodiment. Here, the torque ratio T is calculated from the running mode of the IVT 100 and the speed ratio I of the CVT 2. The remaining features are identical to those of the first embodiment.

In a step S21 of FIG. 18, the rotation speed Nin of the IVT input shaft 1A of the IVT 100, a rotation speed CNout of the continuously variable transmission output shaft, the vehicle speed VSP, the accelerator depression amount APS and the running mode of the IVT 100 are read.

In a step S22, the target output shaft torque tTo is computed from the vehicle speed VSP and accelerator depression amount APS based on the map shown in FIG. 7.

Next, in a step S23, the speed ratio I of the CVT 2 is computed from the speed ratio of the IVT input shaft 1A and CVT output shaft 4 by the following equation:

$$I=N\text{in}/CN\text{out}$$

In a step S24, the torque ratio T of the IVT 100 is computed from the speed ratio I and the aforesaid running mode. The torque T is computed based on a preset map shown in FIG. 17.

Next, in the step S5 and subsequent steps, as in the case of the first embodiment, the target output shaft torque tTo is divided by this torque ratio T to compute the target engine torque tTe. In the step S6, the target input shaft rotation speed tNin is computed according to the target output shaft torque tTo and vehicle speed VSP by the preset map shown in FIG. 6.

In the step S7, the target input shaft rotation speed tNin and target engine torque tTe are output. Specifically, the target input shaft rotation speed tNin is commanded to the speed change control mechanism 52, the target engine torque tTe is commanded to an engine controller, not shown, and the target opening tTVO is computed to drive the electronically controlled throttle valve 102.

In this case, as the speed ratio I of the CVT 2 is used for computing the torque ratio T, the computational precision in the vicinity of the GNP at which the IVT output shaft rotation speed Nout is near to 0, can be improved.

In the IVT 100 shown in FIG. 2, at the GNP where the IVT speed ratio is infinite, the IVT output shaft rotation speed Nout is 0, and the detection precision of the output shaft rotation speed sensor 106 decreases. Further, the IVT output shaft rotation speed Nout is very small even in the vicinity of the GNP at which the vehicle is not moving forward or is in the stationary state, so the detection precision of the output shaft rotation speed sensor 106 decreases.

On the other hand, even at the GNP where the IVT output shaft rotation speed Nout=0, the CVT 2 rotates at a predetermined rotation speed. Therefore, the speed ratio I of the CVT 2 can be detected with high precision even in the vicinity of the GNP.

The running mode of the IVT 100 can easily be identified by determining the clutch which is engaged. Specifically, if the power recirculation mode clutch 9 is engaged, it can be determined that the mode is the power recirculation mode, and if the direct clutch 10 is engaged, it can be determined that the mode is the direct mode.

Therefore, by computing the torque ratio T based on the map shown in FIG. 17 from the speed ratio I and the running mode, the precision of computing the GNP can be improved. In addition, differences of transmission efficiency due to the running mode can be accurately reflected in vehicle control, and the precision of drive force control can be improved.

The contents of Japanese Application No. 11-255177, with a filing date Sep. 9, 1999, are hereby incorporated by reference.

The embodiments of this invention in which an exclusive property or privilege is claimed are defined as follows:

What is claimed is:

1. A vehicle drive force control device comprises:
    an infinite speed ratio transmission permitting continuous variation of a speed ratio up to infinity and is joined to a motor,
    running state detection sensors which detect a vehicle running state,
    an input shaft rotation speed sensor which detects a rotation speed of an input shaft of the infinite speed ratio transmission,
    an output shaft rotation speed sensor which detects a rotation speed of an output shaft of the infinite speed ratio transmission, and
    a microprocessor which controls the infinite speed ratio transmission and the motor, wherein this microprocessor is programmed to:
    calculate a target output shaft torque based on a detection value of the running state detection sensor,
    compute a speed ratio factor of an input shaft rotation speed and an output shaft rotation speed as output shaft rotation speed/input shaft rotation speed, from the detection values of the input shaft rotation speed sensor and output shaft rotation speed sensor,
    compute a torque ratio of the infinite speed ratio transmission from this speed ratio factor,
    compute a target torque of the motor from the target output shaft torque of the infinite speed ratio transmission and the torque ratio, control the output of the motor according to this target torque, and compute a target input shaft rotation speed of the infinite speed ratio transmission based on a vehicle speed, and thereby control the speed ratio.

2. A vehicle drive force control device as defined in claim 1, wherein the running state detection sensor comprises an accelerator pedal depression amount detection sensor which detects a depression amount of an accelerator pedal, and a vehicle speed detection sensor which detects a vehicle speed.

3. A vehicle drive force control device as defined in claim 1, wherein the microprocessor is programmed to compute the torque ratio according to the speed ratio and target output shaft torque.

4. A vehicle drive force control device as defined in claim 1, wherein the microprocessor is programmed to compute the target input shaft rotation speed from the vehicle speed and target output shaft torque.

5. A vehicle drive force control device as defined in claim 1, wherein the microprocessor is programmed to compute the target input shaft rotation speed from an accelerator pedal depression amount and the vehicle speed.

6. A vehicle drive force control device as defined in claim 1, wherein the infinite speed ratio transmission comprises a combination of a continuously variable transmission and a fixed speed ratio transmission, and the microprocessor is programmed to compute a speed ratio of this continuously variable transmission, and compute the torque ratio based at least on this speed ratio.

7. A vehicle drive force control device as defined in claim 6, wherein the microprocessor is programmed to compute the speed ratio of the continuously variable transmission and the torque ratio based on a running mode of the infinite speed ratio transmission.

8. A vehicle drive force control device comprises:

an infinite speed ratio transmission permitting continuous variation of a speed ratio up to infinity and is joined to a motor, running state detection means for detecting a vehicle running state, means for detecting a rotation speed of an input shaft of the infinite speed ratio transmission, means for detecting a rotation speed of an output shaft of the infinite speed ratio transmission, means for calculating a target output shaft torque based on a detection value of the running state detection sensors, means for computing a speed ratio factor of an input shaft rotation speed and an output shaft rotation speed as an output shaft rotation speed/input shaft rotation speed, from the detection values of the input shaft rotation speed sensor and output shaft rotation speed sensor, means for computing a torque ratio of the infinite speed ratio transmission from this speed ratio factor, means for computing a target torque of the motor from the target output shaft torque of the infinite speed ratio transmission and the torque ratio, means for controlling the output of the motor according to this target torque, and means for computing a target input shaft rotation speed of the infinite speed ratio transmission based on a vehicle speed, and thereby control the speed ratio.

* * * * *